UNITED STATES PATENT OFFICE.

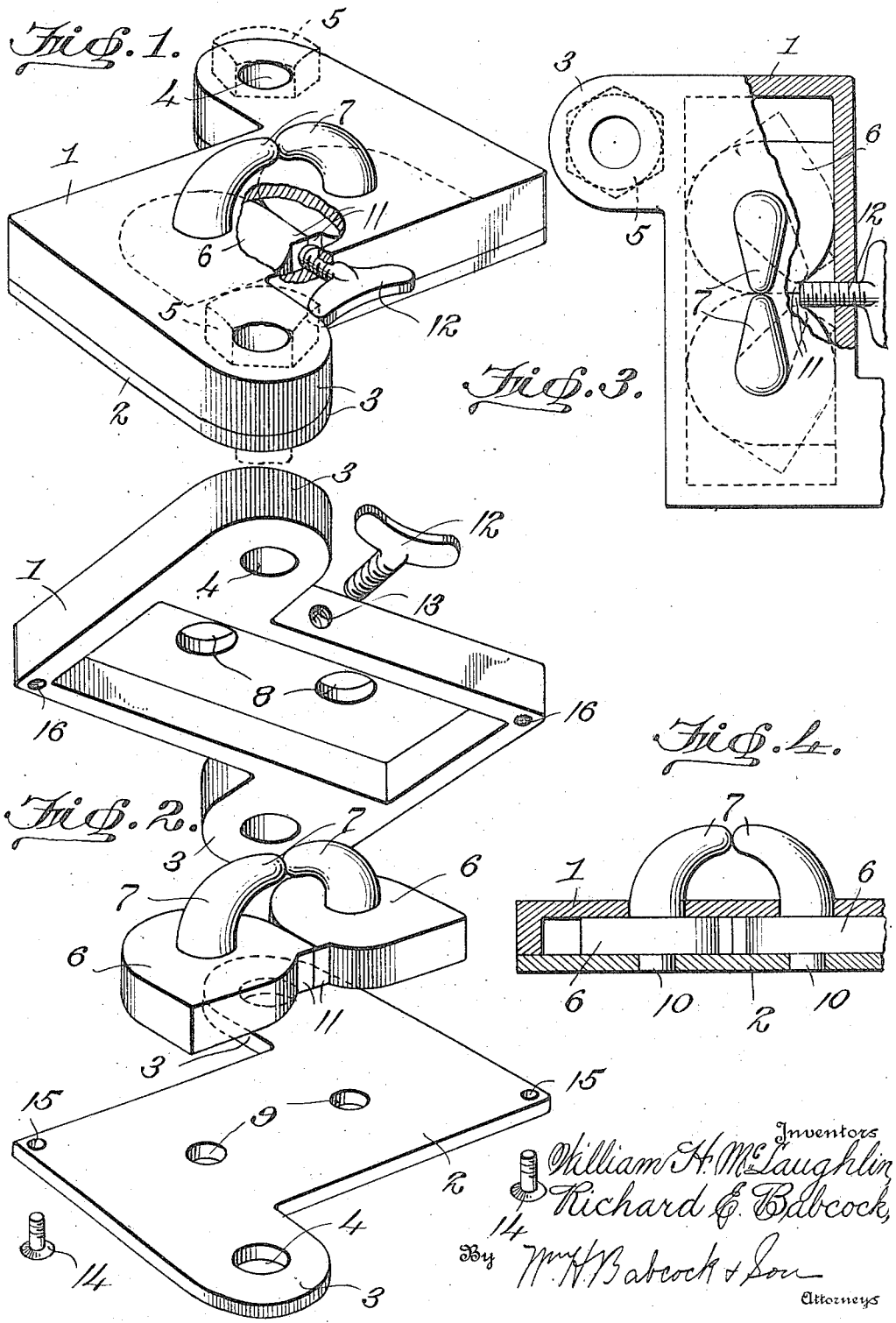
W. H. McLAUGHLIN & R. E. BABCOCK.
CONNECTING DEVICE.
APPLICATION FILED SEPT. 5, 1917.
1,260,423.
Patented Mar. 26, 1918.

WILLIAM H. McLAUGHLIN, OF HARTFORD, CONNECTICUT, AND RICHARD E. BABCOCK, OF BARCROFT, VIRGINIA, ASSIGNORS, BY DIRECT AND MESNE ASSIGNMENTS, TO CASSIUS S. CHASE, OF HARTFORD, CONNECTICUT.

CONNECTING DEVICE.

1,260,423.  Specification of Letters Patent.  Patented Mar. 26, 1918.

Application filed September 5, 1917. Serial No. 189,803.

*To all whom it may concern:*

Be it known that we, WILLIAM H. McLAUGHLIN and RICHARD E. BABCOCK, citizens of the United States, residing, respectively, at Hartford, in the county of Hartford and State of Connecticut, and at Barcroft, in the county of Alexandria and State of Virginia, have invented certain new and useful Improvements in Connecting Devices, of which the following is a specification.

This invention relates to connecting devices or fasteners intended by applicants more particularly for use with anti-skid chains, of the fixed point type, for automobile truck wheels. However, the invention is not at all limited to this use, but is capable of use to advantage in a great many ways in many different arts.

The primary object of this invention is to provide means, movable with relation to each other and their casing, to receive and hold chain links and the like against disengagement therefrom. Other objects are, to provide a casing in which said parts are moved and by which they are held and braced; to provide for the locking of said parts in closed position; to provide for expeditious, easy and cheap repair or replacement of parts; to increase durability and simplicity and secure compactness, while at the same time decreasing the cost of manufacture, all of which objects, among others, are accomplished by the combination, construction and arrangement of parts, all as hereinafter more particularly set forth, described and claimed.

In the accompanying drawings:

Figure 1 represents a perspective view of a device embodying our invention, the casing being broken away to show the locking screw in engagement with the shoulders of the blocks;

Fig. 2, is a perspective view of the parts in separated superposed arrangement;

Fig. 3, a top plan view, partly broken away, showing the hooks in full lines in closed position and indicating them in dotted lines in open position; and Fig. 4, a longitudinal sectional view through the device, showing the hooks and blocks in elevation.

The casing of the device is composed of a recessed top plate or cap 1 having parallel inner side faces and parallel inner end faces which are at right angles to the inner face of its top wall, which face is parallel to the inner or upper face of the base-plate 2. It is important that the inner faces of the top wall of plate 1 and the base plate 2 be of such conformation that the blocks 6 can freely rotate between them. The other faces, while shown as above described, may be of any suitable form desired so long as they permit the movement of blocks 6 as required. It is highly desirable that the top wall of plate 1 and plate 2 should engage the respective top and bottom faces of the blocks 6 in order to brace them, but this is not absolutely essential.

Said plates 1 and 2 are the same in outline, of the same size and provided with two lateral lugs 3, one on each end, and on opposite sides of the plates. These lugs 3 are provided with perforations 4 to receive fastening or anchoring bolts 5, the heads of which are indicated in dotted lines in Fig. 1. These bolts 5, passing through the perforations in the lugs of both plates and into some object on which the device is mounted, will firmly hold the plates 1 and 2 together and the device as a whole on such object.

These plates 1 and 2 are provided on their central longitudinal line with two holes 8 and 9 respectively, each of the holes 8 having the same axis as its registering hole 9 and being of greater diameter than said hole 9.

Each of the blocks 6 is provided with a hook 7 projecting from its upper face and with a stud or lug 10 projecting from its lower face, the base of said hook 7 and said stud or lug 10 having the same axis. The hook 7 at its base is cylindrical as shown and of such diameter as to fit snugly in its corresponding hole 8, while the stud or lug 10 is similarly shaped and similarly received by its corresponding hole 9.

When both blocks 6 and the two plates 1 and 2 of the casing have been assembled as above the free ends of the hooks 7 in normal position will preferably just touch, effectually closing the space embraced by said hooks 7 against the egress or ingress of a chain link or the like to or from said space and preventing the application or removal of a chain link or the like to or from either of said hooks.

In order that said hooks 7 and blocks 6 may be expeditiously and securely locked in place the adjacent portions of said blocks on one side are formed with shoulders 11 to be engaged by the end of the locking thumb or wing screw 12 working through the internally screw-threaded hole 13 in the adjacent side wall of plate 1, as shown in Figs. 1 and 3, the outer end portions of the faces or edges of said blocks 6 adjacent said side wall being straight so as to abut against the inner face of said side wall of plate 1, preventing the further rotary movement in that direction.

The inner end portions of said edge of said blocks 6 and the corners of the opposite sides of said blocks 3 are to be rounded or otherwise formed or cut away to allow rotary motion by said blocks 6 on the axes of said studs 6 and hooks 7 in the reverse direction out of normal position to the position shown in dotted lines in Fig. 3 when the screw 12 is unscrewed so as to move its inner end out of the way of said shoulders 11. When in this dotted line position the free ends of the hooks will be separated by an interval sufficient to permit the ingress or egress of a chain link or the like to or from the space embraced by said hooks 7, allowing the application or removal of a chain link or the like to or from either of said hooks 7.

When the parts have been assembled as above they may be held in assembled relation by two screws 14 passing through perforations 15 in plate 2 and screwing into the respective screw-taps 16 in plate 1, but this feature is not essential.

The hooks 7 and studs or lugs 10 will preferably be integral with their respective blocks 6, which will preferably be made of drop-forged steel.

Any suitable material may be used for any part.

Having thus described our invention, what we claim as new and desire to secure by Letters Patent is:

1. A plate, in combination with a plurality of blocks having different axes and rotatably mounted with relation to said plate and provided with hooks which in normal position are adjacent each other, and means for locking said hooks in normal position.

2. A plate, in combination with a plurality of blocks having different axes and rotatably mounted in said plate and provided with hooks which in normal position lie adjacent each other, and means for locking said blocks in normal position.

3. A plate, in combination with a plurality of blocks having different axes and rotatably mounted in said plate and provided with integral hooks which in normal position are adjacent each other, and means for locking said blocks in normal position.

4. A plate, in combination with a plurality of blocks having different axes and rotatably mounted in said plate, provided with integral hooks which in normal position are adjacent each other, and having shoulders, and means adapted to engage said shoulders to prevent the rotary movement of said blocks.

5. A perforated top plate and a perforated base plate, in combination with two blocks rotatably mounted between said plates, each of said blocks being provided with a hook which projects through a perforation in the top plate and a lug which projects into a perforation in said base plate, said hook and lug having the same axis, and means for locking said blocks in normal position wherein the free ends of the hooks abut.

6. A perforated top plate and a perforated base plate, in combination with two blocks rotatably mounted between said plates, each of said blocks being provided with an integral hook which projects through a perforation in the first mentioned plate and an integral lug which projects into a perforation in said base plate, said hook and lug having the same axis, and means for locking said blocks in normal position, wherein the free ends of the hooks abut.

7. A plate, in combination with two blocks having different axes and rotatably mounted with relation to said plate and provided with hooks, and means for locking said blocks in normal position, wherein the outer portion of the outer ends of each block abuts against a fixed object, said locking means engaging blocks on their inner end portions.

WILLIAM H. McLAUGHLIN.
RICHARD E. BABCOCK.

Copies of this patent may be obtained for five cents each, by addressing the "Commissioner of Patents, Washington, D. C."